Aug. 19, 1947.  O. J. BLOMBERG  2,425,985
CLUTCH WEAR SIGNAL
Filed Jan. 22, 1944  2 Sheets-Sheet 2

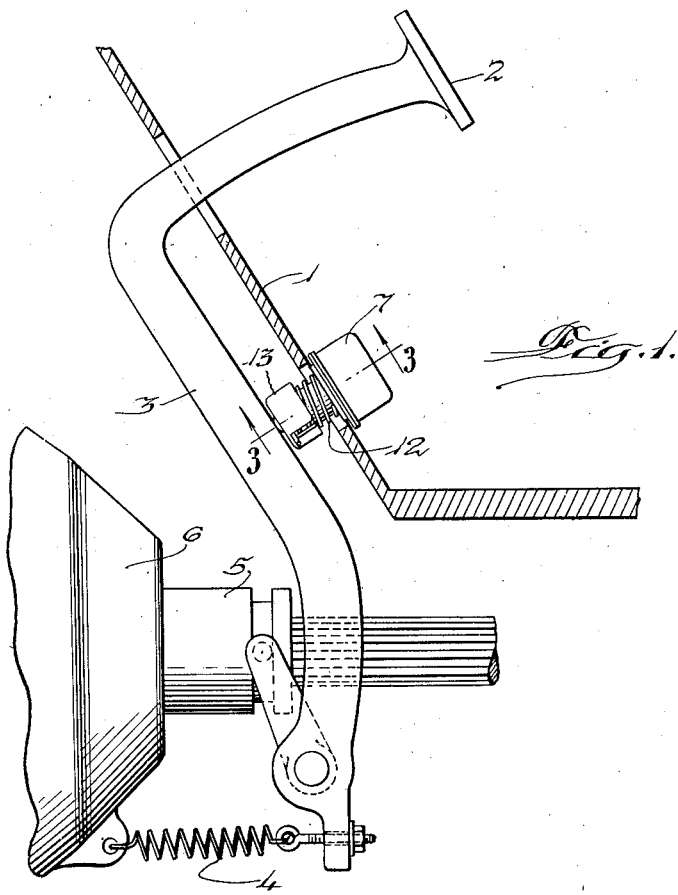
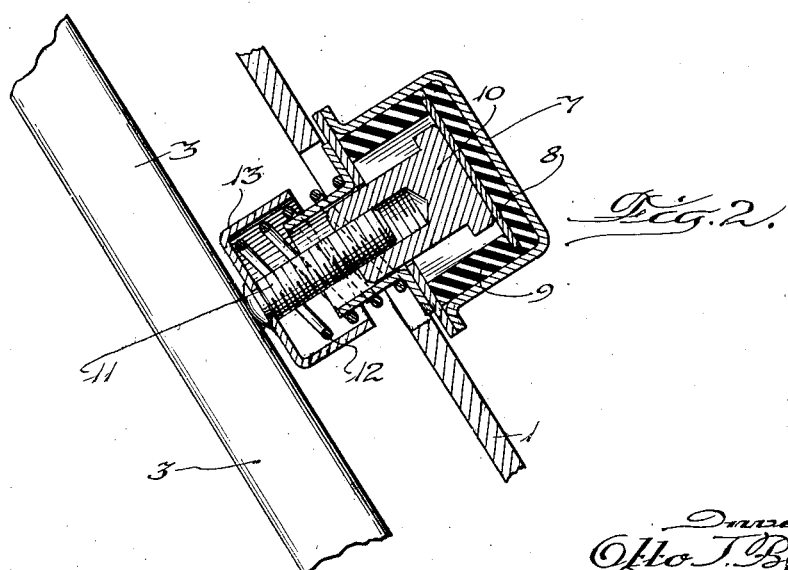

Inventor:
Otto J. Blomberg
By Barnett & Truman
Attorneys

Patented Aug. 19, 1947

2,425,985

UNITED STATES PATENT OFFICE 2,425,985

CLUTCH WEAR SIGNAL

Otto J. Blomberg, Chicago, Ill., assignor, by mesne assignments, of one-half to Katharine C. Barnett, Glencoe, Ill.

Application January 22, 1944, Serial No. 519,290

6 Claims. (Cl. 192—110)

This invention relates to an improved device for automatically sounding an alarm or actuating any other signal whenever certain parts subject to wear have been worn down to a point where safety requires attention, replacement or readjustment.

More specifically, my invention is designed for use in motor vehicles in connection with the clutch mechanism whereby whenever the clutch plates become unduly worn or out of adjustment the driver will be automatically notified of that fact.

In its ordinary application my invention comprises a circuit closer which is normally held open by the position of the clutch plates when in normal adjustment but as the clutch plates wear, the resulting change in clearance of the clutch opening and closing mechanism, such as the ordinary clutch pedal, will cause the electric circuit to be closed and the danger signal to be actuated.

In the drawings, I have assumed a conventional clutch involving usual clutch members, such as the driven and driving plates, the usual strong clutch spring which holds these plates in operative engagement with each other, the usual spring actuated clutch opening or throw-out lever and a circuit closer mounted on the floor board of the car, and having a normally open circuit closing button engaging the clutch throw-out lever and arranged to be moved to close an electric circuit as the wear of the clutch plate allows the shaft of the clutch throw-out lever to move more closely to the underside of the floor board. One side of the circuit closer is grounded, as, for example, through the clutch throw-out lever. The other side of the circuit closer is electrically connected with the horn, a buzzer signal, light or other suitable signal, with suitable connections to the battery so that when the circuit is closed by the sufficient automatic return movement of the clutch throw-out lever the signal is actuated.

With many motor vehicles the parts are so yieldingly mounted that as the clutch plate first wears to a point permitting closure of the circuit, the closure will be intermittent and the signal will be correspondingly intermittent, but if the parts are not then adjusted, the wear of the clutch plate will progress to a point where the closure and signal will be constant.

In the accompanying drawings,

Fig. 1 shows a clutch actuated pedal, in connection with my circuit closing device mounted on the floor board.

Fig. 2 is a cross-section through the circuit closing device in engagement with the shaft of the clutch pedal looking in the direction of the arrow 3 in Fig. 1 with the circuit closed.

Figure 3:
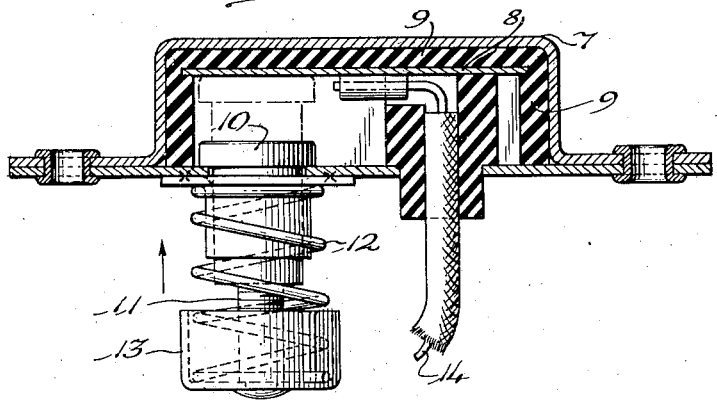
Fig. 3 is a cross-section through the circuit closing device at right angles to Fig. 2, showing the electrical conductor connected with the insulated plate of the circuit closer and showing the closing button indicated in successive positions.
Figure 4:
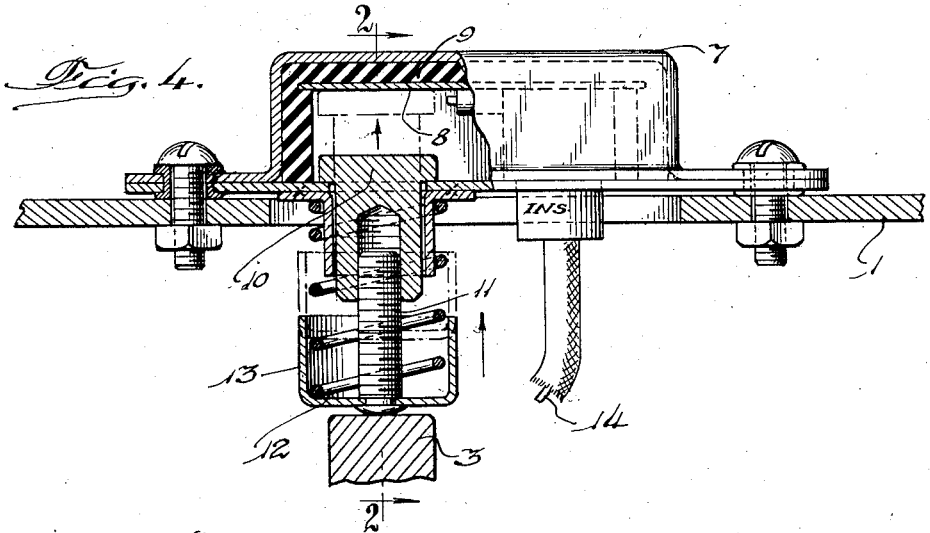
Fig. 4 is similar to Fig. 3 with the parts shown partially enclosed and partially in section.

In the drawings, 1 represents the floor board of an automobile, 2 the clutch pedal, 3 the shaft of the clutch pedal, 4 the return spring of the clutch pedal, 5 a portion of typical clutch shifting mechanism, 6 a portion of the clutch housing. 7 is a housing, within which is mounted a contact plate 8, suitably connected with a conductor, such as 14, to complete the circuit. The contact plate is insulated by suitable insulating material 9. 10 is a button which is shown as adjustably mounted on an adjustment screw 11 and normally held out of contact with the plate 8 by a spring 12. The lower end of the spring 12 is conveniently contained in a cap 13. The button 10 may be conveniently grounded, for example, as shown in Fig. 2, through the screw 11 and the clutch lever shaft 3.

In Fig. 3, the contact plate 8 is connected in the electric circuit through the conductor 14.

By this arrangement it will also be seen that the spring actuated cap 13 and the parts connected therewith will serve as a resilient stop for the shaft 3 of the clutch pedal. While the clutch pedal return spring 4 is strong enough to return the clutch pedal to normal position, it is not sufficiently strong to overcome the resilience of the spring 12 on the closure button and while the spring 12 offers sufficient resistance to the action of the clutch lever return spring 4, so as to hold this circuit open under normal conditions and so as to act as a resilient stop for the shaft of the clutch pedal, on the other hand, the spring 12 will yield to the pressure of the conventional clutch plate actuating springs, not shown, so that when the clutch plate wears, the force of the clutch actuating springs will overcome the resilience of the circuit closer spring 12 and permit the button 10 to be moved into contact with the plate 8 and thus close the circuit and sound the alarm signal. With the clutch in normal adjustment the engagement of certain of the clutch parts will stop the return movement of the clutch throw-out pedal shaft short of circuit closing position.

With this explanation, it will be seen that when the clutch plates are in normal adjustment, the pressure of the clutch plate springs will bring the clutch plates into operative engagement while the clutch shaft 3 has such clearance below the floor board 1 that the alarm signal will not be closed. As the clutch plates wear, the pressure of the clutch engaging springs exerted through the clutch lever will gradually close the clearance between the clutch shaft 3 and the floor board 1 until ultimately the button 19 comes in contact with the plate 8, closing the circuit and actuating the alarm signal.

Figure 5:
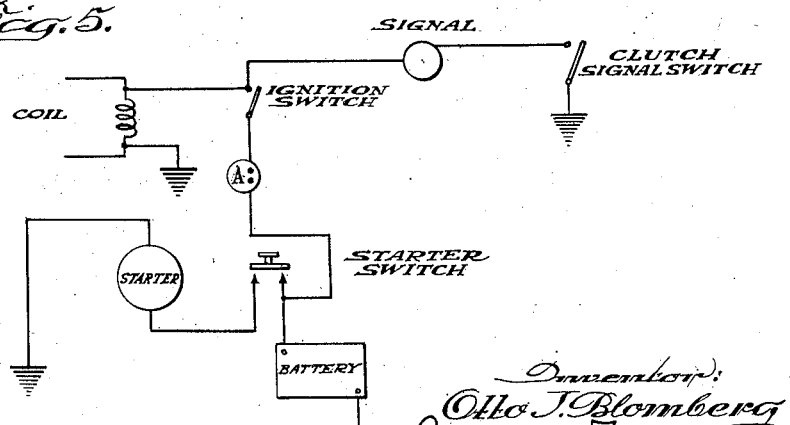
Fig. 5 is a typical diagram of the wiring and connected parts.

Figure 5 is a typical wiring diagram. With the parts arranged and wired as there shown, it is apparent that when the ignition switch is open, my alarm device will be inoperative, but as soon as the ignition switch is closed my safety device becomes immediately operative and will sound the alarm whenever the clutch mechanism requires adjustment or requires the replacement of worn clutch plates.

Obviously my invention can be adapted to any form of clutch operating mechanism by so mounting the circuit closing mechanism as to automatically close the alarm circuit whenever the wear or maladjustment of the clutch mechanism permits such an increased movement of clutch actuating mechanism as to close the alarm circuit.

I claim:

1. In combination with the floor board and clutch mechanism comprising clutch plates of an automobile, of a circuit closer mounted on said floor board, a spring normally holding said circuit closer in open position, a clutch throw out lever, a lever return spring normally holding said lever in engagement with said circuit closer, said circuit closer serving as a resilient stop for the spring actuated movement of said lever, said return spring being insufficient to overcome said circuit closer spring and spring means for holding the clutch plates in operative relation to each other and sufficiently powerful to overcome said circuit closer spring whereby said circuit closer is closed whenever the clutch requires adjustment.

2. In a device of the class described, the combination with clutch plates, resilient means arranged to normally hold said plates in operative engagement with each other, a lever to disengage said plates and be returned towards normal position by said resilient means, a spring tending to move said lever in a switch closing direction, a switch adapted to be closed by said lever, a spring holding said switch in open position, said spring having greater strength than the lever spring but of less strength than the resilient plate holding means whereby the switch is normally held open but will be moved to closed position by the further movement of said lever in a switch closing direction by said resilient means due to wear or maladjustment of said clutch plates.

3. In a device of the class described, the combination with clutch plates, resilient means arranged to normally hold said plates in operative engagement with each other, a lever to disengage said plates, a spring tending to move said lever in a switch closing direction, a switch adapted to be closed by said lever, but held open by the normally operative engagement of said clutch plates whereby said clutch plates act as a stop to limit the movement of said lever in a direction to close said switch but arranged to be closed by the further movement of said lever in a switch closing direction due to wear or maladjustment of said clutch plates, said switch comprising a resilient circuit closing member mounted on a stationary support and serving as a resilient stop for said lever when said lever is actuated by said spring.

4. The combination with a clutch of a clutch pedal shaft a clutch spring that will move said shaft oppositely from disengaging movement as the clutch wears, a clutch pedal return spring normally holding said shaft in a retracted position and a circuit closer adapted to be closed by the clutch spring actuated movement of said shaft beyond its normal position.

5. In combination a clutch comprising pressure plates, spring means for holding said plates in operative relation to each other, a throw-out lever arranged to disengage said plates from such operative relation and be returned towards normal position by said spring means, resilient means for normally returning said lever to a position of rest, a circuit closer actuated by the return movement of said lever by said spring means beyond normal position, and adjustment means on said circuit closer whereby said circuit closer is normally actuated to closing position only when the clutch requires adjustment.

6. In a device of the character described, the combination with an actuating lever of a stationary support, a spring for holding the lever in a position of rest, a circuit closer mounted on said support, a spring normally holding said circuit closer in open position, said circuit closer engaging said lever and serving as a resilient stop for said lever, clutch means adapted to be disengaged by said lever, spring means normally holding said clutch in engaged position all so arranged that wear of the parts arranged to be actuated by said lever and normally acting as a positive stop to limit the spring actuated movement of the lever, will permit the clutch spring means to cause said lever to compress the resilient member of said stop sufficiently to permit movement of said circuit closer to closed position.

OTTO J. BLOMBERG.

REFERENCES CITED

The following references are of record in the file of this patent:

UNITED STATES PATENTS

| Number | Name | Date |
|---|---|---|
| 2,323,489 | Schmidt et al. | July 6, 1943 |
| 1,307,236 | Wesolek | June 17, 1919 |
| 1,589,653 | Morris | June 22, 1926 |
| 1,352,279 | Keppel | Sept. 7, 1930 |
| 1,873,141 | Norviel | Aug. 23, 1932 |